H. J. FORSTER.
RATCHET AND DRILL EXTENSION.
APPLICATION FILED JULY 18, 1905.
939,900.
Patented Nov. 9, 1909.
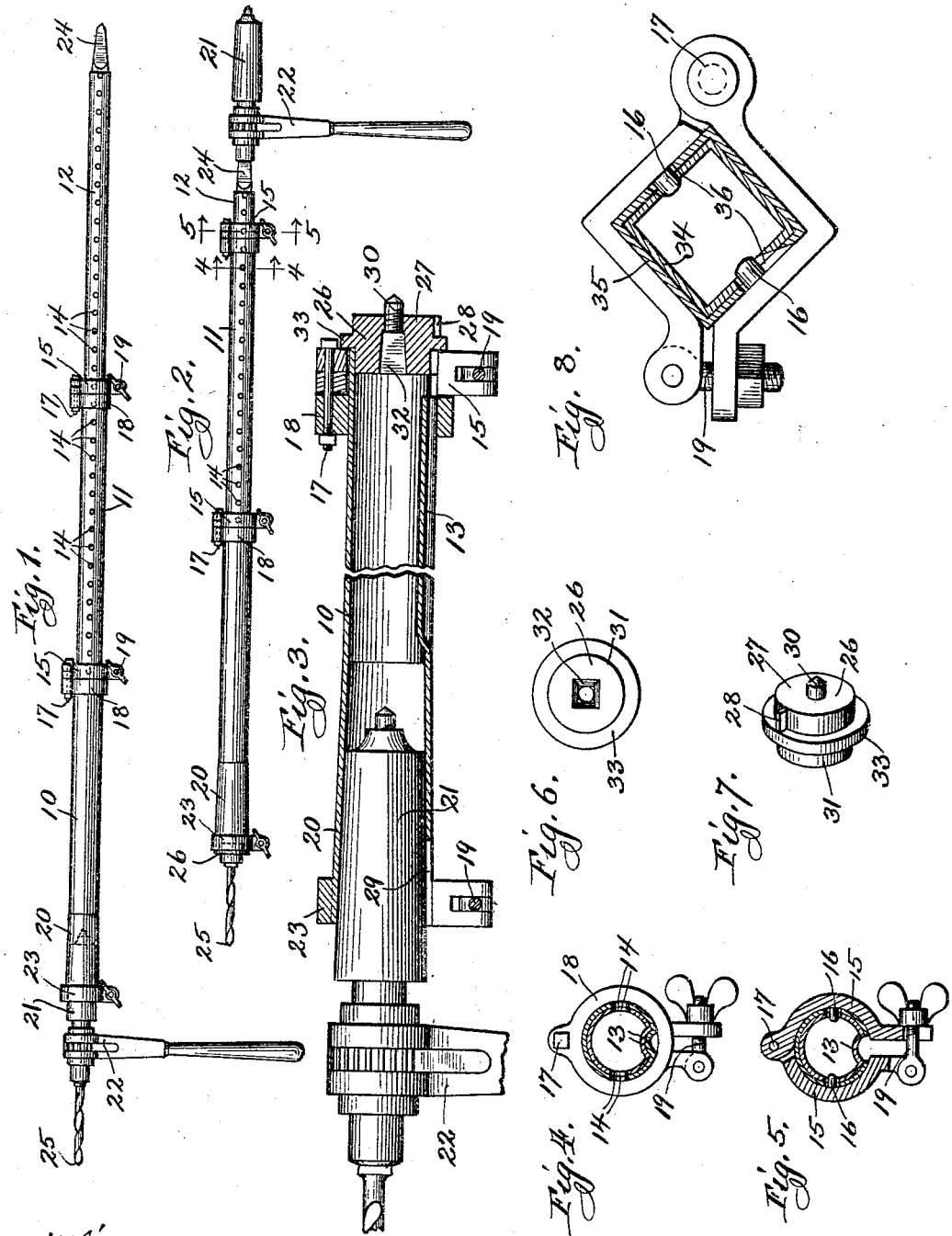
Witnesses:
Chas. E. Gibbs
Frances Davis
Inventor:
Harry J. Forster
By R. J. Jackler
Atty

UNITED STATES PATENT OFFICE.

HARRY J. FORSTER, OF CHICAGO, ILLINOIS.

RATCHET AND DRILL EXTENSION.

939,900.  Specification of Letters Patent.  Patented Nov. 9, 1909.

Application filed July 18, 1905. Serial No. 270,286.

*To all whom it may concern:*

Be it known that I, HARRY J. FORSTER, a citizen of the United States, residing at Chicago, in the county of Cook and State of Illinois, have invented a new and useful Ratchet and Drill Extension, of which the following is a specification.

My invention relates to adjustable extensions for metal drills in which are employed telescoping tubes and the objects of my improvements are, first, to provide an adjustable blocking or purchase for a drill ratchet; second, to provide an adjustable drill extension; third, to make a cheap, strong and durable construction and other objects to become apparent from the description to follow.

When drilling holes into metal, it is necessary to have a solid fixed backing against which the force is exerted when feeding the drill. Heretofore, this backing was formed by blocking up from some fixed wall or abutment to within reach of the ratchet feed, which in a great many cases consumed considerable time and in some cases was very difficult to accomplish. In some instances, especially in connection with boiler repair work, it is necessary to drill holes in a portion which is so situated that there is no room to swing the ratchet handle any place near the hole to be drilled, and to accomplish the drilling of holes in such localities, an extra long drill was used. Thus such drilling heretofore was difficult and consumed considerable time.

By the use of my invention such drilling as above described is accomplished with ease, accuracy and speed; and the device besides possessing these advantages is interchangeable and adjustable to a large degree.

It consists of a plurality of telescoping tubes provided with interlocking mechanism for their rotating and longitudinal adjustment, and interchangeable end parts, as illustrated on the accompanying sheet of drawing forming a part of this specification, in which:—

Figure 1, is an elevation of my invention when used as a ratchet extension; Fig. 2, is an elevation of the same when used as a drill extension; Fig. 3, is an enlarged longitudinal sectional view of my invention foreshortened showing it in a differently adjusted position; Fig. 4, is a section on line 4—4 of Fig. 2; Fig. 5, is a section on line 5—5 of Fig. 2; Fig. 6, is a face view of an interchangeable end piece forming a part of my invention; Fig. 7, is a perspective view of the same and Fig. 8, is a cross section of a modified form.

Similar reference characters refer to similar parts throughout the several views.

The tool comprises the three tubular sections, 10, 11 and 12; the tube 10 fitting over the tube 11, and the tube 11 fitting over the tube 12; and the telescoping portions of said tubes being provided with the longitudinal intermeshing beads 13 to prevent their relative rotatable movement, but allow their relative longitudinal movement.

To positively lock the sections 10, 11 and 12 together in any desired position, the sections 11 and 12 are provided with a series of holes 14 arranged in a longitudinal line and all equally spaced; the ends of the tubes 10 and 11 are provided with clamping collars 15 which have the integral pins or lugs 16 extending through the coöperating holes 14.

The collars 15 are made in two separate halves pivoted together by the pin or bolt 17 secured in the lug or collar 18 attached rigidly to its coöperating tube. The two halves of the collar 15 are arranged to be clamped to its coöperating tube by a bolt 19 pivoted to one of said halves and passing through a radial slot provided in the other half, with a thumb nut on the extending end of the bolt. By this arrangement the clamping collar 15 is always attached to its respective tube and can easily and quickly be loosened and tightened for the purpose of adjusting the tubes longitudinally.

The free end 20 of the tube 10 is made to fit over the feeding sleeve 21 of the ratchet 22. The sleeve 21 is shown tapered but may be made of any desired form. A clamping collar 23 is secured to the extremity of the end 20 to clamp the end 20 about the sleeve 21. When the sleeve 21 is made tapering it will automatically secure itself by friction into the end 20 when pressed into the same, but the clamping collar 23 can be used as an additional safeguard.

The free end of the tube 12 has rigidly secured therein the concentric pivoting point 24, the body portion of which is square in cross section and tapered identical with the butt end of an ordinary drill, so that it will fit into the drill socket provided in the ratchet 22.

In operation the drill point 25 is placed against the surface to be drilled, the telescoping tubes 10, 11 and 12 are placed in position with the end 20 of tube 10 over the feeding sleeve 21 of the ratchet 22, and extended until the pivoting point 24 rests against a stationary portion on which is laid a metal block not shown provided with a counter-sunk hole to receive the point 24. The tubes 10, 11 and 12 are rotated by hand to turn the feeding sleeve 21 which pushes the drill point 25 against the work to be drilled with force, and the ratchet is operated causing the drill to rotate and cut. As fast as the drill cuts it is fed forward by turning the feeding sleeve 21.

In Fig. 1, my device is shown as a feed screw extension, that is, the drill is secured in the drill socket of the ratchet 22, the telescoping tube 10 is secured to the feeding sleeve 21 and to feed the drill forward the telescoping tubes 10, 11 and 12 are turned.

In Fig. 2, my device is shown as a drill extension, that is, the point 24 of the tube 12 is secured in the drill socket of the ratchet 22, the drill is fed forward by turning the feeding sleeve 21 and the drill is rigidly secured to the end 20 of the tube 10. To secure the drill in the end of the tube 10, a round block 26 is provided. One end 27 of the block 26 is of a size to fit into the end 20 of the tube 10 and is provided with a longitudinally extending rib 28 arranged to enter the slot 29 in the end 20 and prevent the block 26 from turning in said tube end, and a pivot point 30 secured concentrically in the end thereof. The other end 31 of the block 26 is of a size to fit the telescoping tube 10 as shown in Fig. 3 of the drawing and is provided with the concentric drill socket 32. A circumferential flange 33 surrounds the block 26 midway of the two ends 27 and 31 and serves as a stop when either of said ends are inserted into the ends of the tube 10.

Fig. 3 shows the manner of using my device for short extensions and when a single tube is used, that is, the tube 10 is secured to the feeding sleeve 21 the same as shown in Fig. 1, and the block 26 is secured in the other end of the tube 10 with the point 30 exposed. The block 26 is securely clamped in position by the clamping collar 15.

The telescoping tubes may be of any desired shape and other changes in the details of construction may be made without in the least departing from the spirit of my invention.

In Fig. 8, is shown a modification having the square tubes 34 and 35, provided with the perforations 36 and a clamping device similar to that already described, to fit the square tubes.

Having thus fully described my invention what I claim as new and desire to secure by Letters Patent of the United States is:—

In a device of the class described, a bar rigid throughout, provided at one end with a square tapering extension having a center bearing at its extremity, and at the other end with a clamping sleeve to fit the feed screw of a ratchet, whereby a ratchet may be applied to either end of said bar.

In testimony whereof I have signed my name to this specification in presence of two subscribing witnesses this 15th day of July 1905, at Chicago, Illinois.

HARRY J. FORSTER.

Witnesses:
J. H. FORSTER,
ELLERY STOCKBERGER.